US008331959B2

(12) United States Patent  
Tomioka

(10) Patent No.: US 8,331,959 B2  
(45) Date of Patent: Dec. 11, 2012

(54) MOBILE COMMUNICATION TERMINAL DEVICE, QOS CONTROL DEVICE, MOBILE COMMUNICATION SYSTEM, AND METHOD OF GUARANTEEING QOS

(75) Inventor: Satofumi Tomioka, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 274 days.

(21) Appl. No.: 12/683,467

(22) Filed: Jan. 7, 2010

(65) Prior Publication Data

US 2010/0178917 A1 Jul. 15, 2010

(30) Foreign Application Priority Data

Jan. 14, 2009 (JP) ................................. 2009-005936

(51) Int. Cl.
*H04W 4/00* (2009.01)
*H04W 72/00* (2009.01)
*H04W 24/00* (2009.01)

(52) U.S. Cl. ............... 455/456.3; 455/432.3; 455/435.1; 455/452.2

(58) Field of Classification Search .................. 455/418, 455/432.3, 433, 435.1, 435.3, 450, 456.1–456.3, 455/456.5–456.6, 457, 509, 512–514, 517, 455/550.1, 556.2, 560–561, 67.11, 67.13, 455/135, 420, 452.1–452.2, 507, 560–561; 370/328–329, 395.21, 395.3, 395.5, 341, 370/398

See application file for complete search history.

(56) References Cited

U.S. PATENT DOCUMENTS

| 6,850,764 | B1* | 2/2005 | Patel ............................. 455/450 |
|---|---|---|---|
| 2005/0059397 | A1* | 3/2005 | Zhao .......................... 455/435.2 |
| 2007/0002868 | A1* | 1/2007 | Qian et al. ............... 370/395.21 |
| 2008/0137602 | A1* | 6/2008 | Khivesara et al. ............ 370/329 |
| 2009/0054074 | A1* | 2/2009 | Aaron ......................... 455/452.2 |
| 2009/0117851 | A1* | 5/2009 | Malaney .................... 455/67.11 |
| 2009/0143065 | A1* | 6/2009 | Mattila ......................... 455/423 |
| 2009/0296827 | A1* | 12/2009 | Karaoguz et al. ......... 375/240.26 |
| 2009/0300688 | A1* | 12/2009 | Karaoguz et al. .............. 725/62 |
| 2009/0318131 | A1* | 12/2009 | Aaron ........................... 455/423 |

(Continued)

FOREIGN PATENT DOCUMENTS

CN 1561650 1/2005

(Continued)

OTHER PUBLICATIONS

Yuji Mochizuku and Takeshi Hattori, "A Study of QoS Guaranteed Packet Communication of OFDM using Discrete GPS Scheduling"; General Meeting of Institute of Electronics, Information and Communication Engineers. B-5-164, Electrical and Electronics Engineering, Sophia University, 2006, p. 517.

*Primary Examiner* — Meless Zewdu
(74) *Attorney, Agent, or Firm* — Frommer Lawrence & Haug LLP; William S. Frommer; Paul A. Levy

(57) ABSTRACT

A mobile communication terminal device includes: an operation unit registering information related to a predetermined region in which a user desires QoS guarantee; a sending unit sending the information related to the predetermined region registered in the operation unit and information that can identify a current position of the mobile communication terminal device; a receiving unit receiving QoS guaranteed data when the current position is in the predetermined region; and a control unit controlling a behavior of sending the information in the sending unit and a behavior of guaranteeing the QoS in the receiving unit.

6 Claims, 9 Drawing Sheets

FOREIGN PATENT DOCUMENTS

| | | |
|---|---|---|
| CN | 15616650 | 1/2005 |
| CN | 1799271 | 7/2006 |
| CN | 1823543 | 8/2006 |
| CN | 1878388 | 12/2006 |
| CN | 1969572 | 5/2007 |

* cited by examiner

MOBILE COMMUNICATION TERMINAL DEVICE, QOS CONTROL DEVICE, MOBILE COMMUNICATION SYSTEM, AND METHOD OF GUARANTEEING QOS

BACKGROUND OF THE INVENTION

1. Field of the Invention

The present invention relates to a mobile communication terminal device for which QoS (quality of service) is available, a QoS control device, a mobile communication system, and a method of guaranteeing QoS.

2. Description of the Related Art

As an important technique to ensure quality of communication in computer networks typified by the Internet, a technique called QoS (quality of service) was developed. When predetermined information is transmitted, this technique reserves a bandwidth for the information to guarantee communication quality, such as a certain communication speed, to the information communication. The technique is considered important as one of the techniques to transmit information that should not be delayed or stopped during communication such as video phone call transmission and real-time delivery of audio and video images.

QoS guarantee systems generally carry out a QoS guarantee only for users registered for use of QoS. A user who uses a QoS guarantee asks a QoS guarantee contractor to ensure a bandwidth and pays a consideration to the contractor.

In recent years, various techniques have been proposed by which a QoS guarantee technique as described above is applied to a wireless communication system (for example, refer to Takeshi HATTORI (Sophia University): "A Study on QoS Guaranteed Packet Communication in OFDM using Discrete GPS Scheduling", Institute of Electronics, Information and Communication Engineers General Conference, 2006).

SUMMARY OF THE INVENTION

As described above, various techniques have been proposed in recent years by which such a QoS guarantee technique is applied to a wireless communication system. In such a system, QoS guarantee is generally carried out according to the wireless line utilization rate. Moreover, QoS is guaranteed independently of the location where the user is actually QoS guaranteed. Therefore, at present, such a QoS guarantee system is problematic in that the system may not reflect user's intention to, for example, have QoS guaranteed only at a location where the user desires QoS guarantee.

In view of the above problem, it is desirable to reflect user's intention when QoS is guaranteed in a mobile communication terminal device, a QoS control device, and a mobile communication system to which QoS is applicable, and in a method of guaranteeing QoS.

According to an embodiment of the present invention, a mobile communication terminal device is structured with an operation unit, a sending unit, a receiving unit, and a control unit. In the operation unit, information related to a predetermined region in which the user desires QoS guarantee is registered. The sending unit sends the information related to the predetermined region registered in the operation unit and information that can identify the current position of the mobile communication terminal device. The receiving unit receives QoS guaranteed data when the current position is in the predetermined region. The control unit controls a behavior of sending the information in the sending unit and a behavior of guaranteeing the QoS in the receiving unit.

A QoS control device in an embodiment of the present invention is structured with a receiving unit, a storage unit, a determination unit, and a sending unit. The receiving unit receives the information related to the predetermined region in which the user desires QoS guarantee and the information that can identify the current position of the mobile communication terminal device, which have been sent from a mobile communication terminal device. The storage unit stores the information on the predetermined region received at the receiving unit. The determination unit compares the information which can identify the current position of the mobile communication terminal device with the information related to the predetermined region stored in the storage unit. The sending unit sends QoS guaranteed data to the mobile communication terminal device when the current position of the mobile communication terminal device is in the predetermined region according to a result of comparison in the determination unit.

A mobile communication system of an embodiment of the present invention includes the mobile communication terminal device and QoS control device in the embodiments of the present invention described above; the QoS control device includes the storage unit, the determination unit, and the sending unit, which is a QoS sending unit, as described above. The storage unit stores the information on the predetermined region in which the user desires QoS guarantee, which has been sent from the positional information sending unit of the mobile communication terminal device. The determination unit compares the information which can identify the current position of the mobile communication terminal device, which has been sent from the positional information sending unit, with the information related to the predetermined region stored in the storage unit. The QoS sending unit sends the QoS guaranteed data to the mobile communication terminal device when the current position of the mobile communication terminal device is in the predetermined region according to a result of comparison in the determination unit.

Furthermore, a method of guaranteeing QoS in an embodiment of the present invention guarantees QoS to the mobile communication terminal device in the following procedure. First, the mobile communication terminal device sends the QoS control device information related to a predetermined region in which the user desires QoS guarantee. Subsequently, the mobile communication terminal device sends information that can identify the current position of the device directly or indirectly to the QoS control device. Subsequently, the QoS control device compares the acquired information which can identify the current position of the mobile communication terminal device with the information related to the predetermined region. Then, as a result of the comparison, QoS guaranteed data is sent to the mobile communication terminal device when the current position of the mobile communication terminal device is in the predetermined region.

As described above, in the above embodiments of the present invention, a mobile communication terminal device is QoS guaranteed only in a region registered in a QoS control device by the user. Therefore, according to these embodiments of the present invention, an intention of the user can be reflected when QoS is guaranteed.

DESCRIPTION OF THE PREFERRED EMBODIMENTS

Examples of preferred modes to carry out embodiments of the present invention are described in the following order. However, the embodiments of the present invention are not limited to the following examples.
1. Embodiment: Exemplary Configuration of QoS Guaranteed Mobile Communication System Working in Conjunction with HLR (Home Location Register)
2. Another Embodiment: Exemplary Configuration of QoS Guaranteed Mobile Communication System Working in Conjunction with GPS (Global Positioning System)

1. Embodiment

In an embodiment, a description is given to an exemplary configuration of a QoS guaranteed mobile communication system (mobile communication system) that carries out QoS guarantee according to information on the current position of a mobile communication terminal device registered in an HLR. The HLR automatically acquires information related to identification information (user ID) of the mobile communication terminal device and a base station sent from the mobile communication terminal device via the base station for management purposes. Accordingly, the current position of the mobile communication terminal device is registered in the HLR in such a way.
[Configuration of QoS Guaranteed Mobile Communication System]

Figure 1:
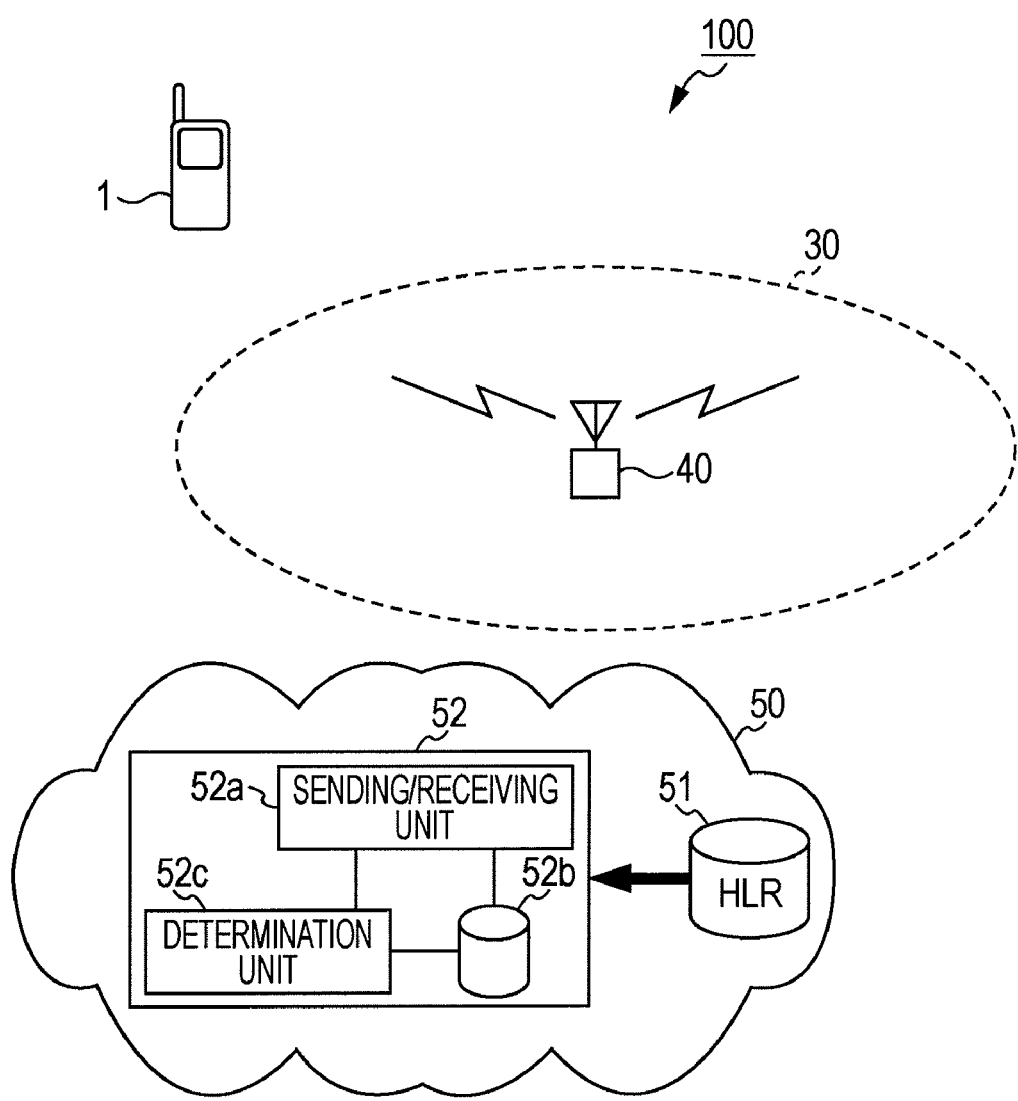
FIG. 1 illustrates the configuration of a QoS guaranteed mobile communication system according to an embodiment of the present invention.

FIG. 1 illustrates the configuration of a QoS guaranteed mobile communication system working in conjunction with the HLR in the present embodiment. The QoS guaranteed mobile communication system 100 mainly includes a mobile communication terminal device 1, a QoS control device 52 (QoS server), and a predetermined mobile communication system network 50, in which the QoS control device 52 is disposed.

Although an example in which the QoS control device 52 and an HLR 51 are disposed in the same mobile communication system network 50 is shown in the present embodiment, this is not a limitation. The QoS control device 52 and the HLR 51 may also be disposed in different mobile communication system networks. The QoS control device 52 is connected to the HLR 51 in the mobile communication system network 50, and thereby can acquire, from the HLR 51, information on the current position of the mobile communication terminal device 1.

The QoS control device 52 has a sending/receiving unit 52a (including a QoS receiving unit), a database 52b (storage unit), and a determination unit 52c. Each unit functions as below.

The sending/receiving unit 52a sends and receives data to and from the mobile communication terminal device 1 via the mobile communication system network 50. For example, the sending/receiving unit 52a provides QoS guarantee to the mobile communication terminal device 1. The sending/receiving unit 52a receives a request for registration of a QoS guarantee applicable region 30 (referred to below as the QoS guaranteed area 30) from the mobile communication terminal device 1.

The database 52b stores (registers) the information on the QoS guaranteed area 30 that is sent from the mobile communication terminal device 1.

The determination unit 52c compares the information on the QoS guaranteed area 30 stored in the database 52b with the information on the current position of the mobile communication terminal device 1, which is acquired from the HLR 51, to determine whether or not the mobile communication terminal device 1 exists within the QoS guaranteed area 30.

Since, in the present embodiment, positional information registered (managed) in the HLR 51 is used as the information on the current position of the mobile communication terminal device 1, the minimum range (unit) of the QoS guaranteed area 30 to be compared with the positional information is preferably a range in which a single base station can deliver radio waves, that is, a cell. However, the range of the QoS guaranteed area 30 to be registered in the database 52b of the QoS control device 52 is changeable appropriately, and a plurality of adjacent cells may also be registered together, or a plurality of non-adjacent cells may also be registered. The QoS guaranteed area 30 to be registered may also be set independently of cells. However, in this case, it is preferred to work on a comparison program so as to allow comparison between the QoS guaranteed area 30 registered in the database 52b and the current position of the mobile communication terminal device 1 obtained from the HLR 51.

The mobile communication terminal device 1 is a so-called mobile phone terminal, and is a terminal device carrying out wireless communication with base stations for wireless phones.

Figure 2:
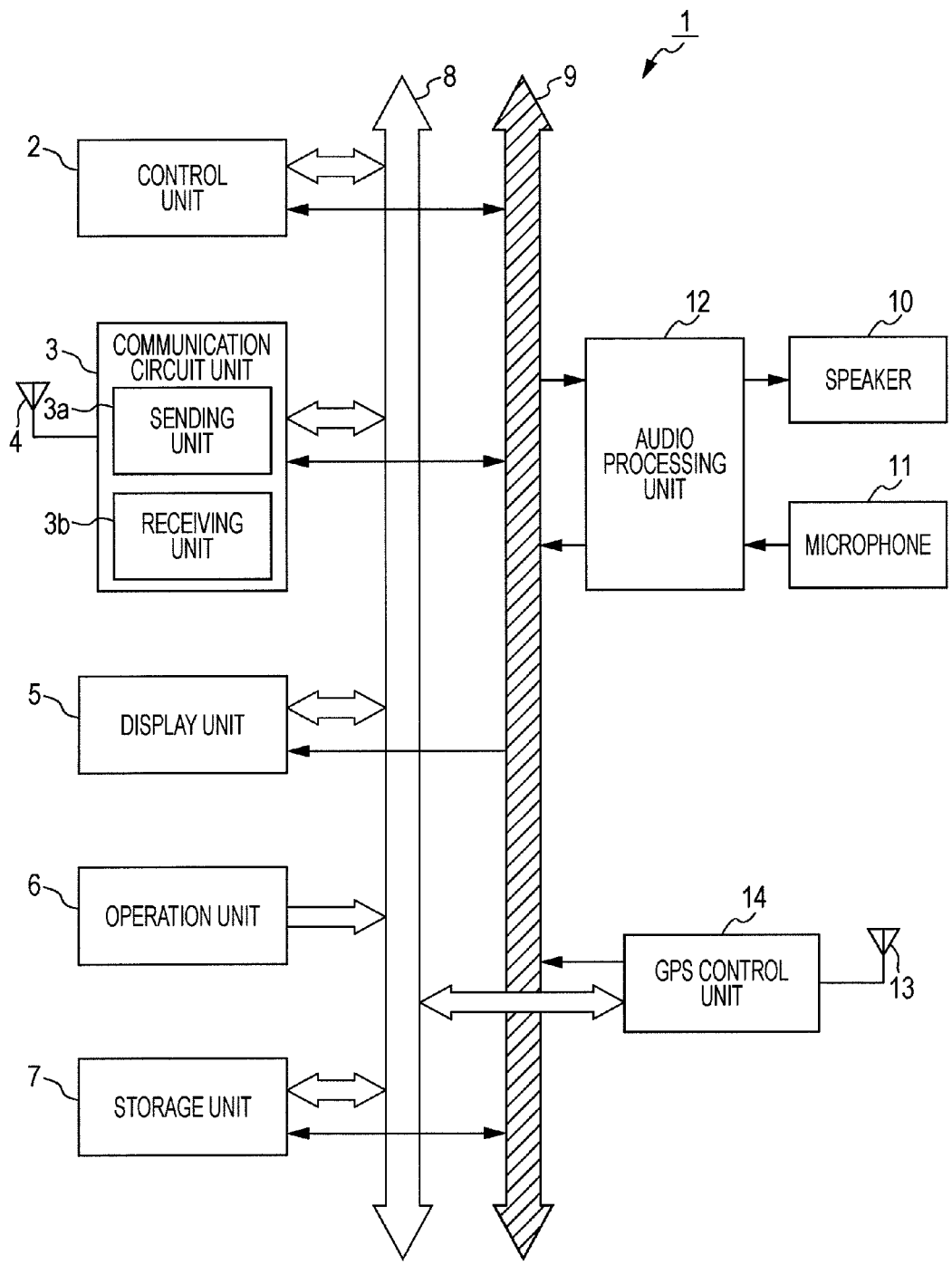
FIG. 2 is a block diagram showing the configuration of a mobile communication terminal device in the embodiment.

FIG. 2 is a block diagram showing the configuration of the mobile communication terminal device 1 in the present embodiment. The mobile communication terminal device 1 has a control unit 2, a communication circuit unit 3, an antenna 4 connected to the communication circuit unit 3, a display unit 5, an operation unit 6, and a storage unit 7, as illustrated in FIG. 2. The mobile communication terminal device 1 also has a speaker 10 to output audio during a call, a microphone 11 to absorb audio during a call, and an audio processing unit 12 that performs digital/analog conversion on audio data during a call.

The mobile communication terminal device 1 further has a GPS antenna 13 and a GPS control unit 14 (positional information acquisition unit) connected thereto. That is, the mobile communication terminal device 1 in the present embodiment is provided with a function of acquiring positional information of the mobile communication terminal device 1 by the GPS.

The mobile communication terminal device 1 further has a control line 8 and a data line 9. The control line 8 is a signal line to emit a signal controlling each unit connected thereto.

Some units in the mobile communication terminal device 1 is, as illustrated in FIG. 2, connected to the control unit 2 through the control line 8, and a process in each unit is carried out under control of the control unit 2. The data line 9 is a signal line to carry out data transmission between units connected thereto. Although not illustrated in FIG. 2, the mobile communication terminal device 1 has a power source unit to supply electricity from the power source unit to each unit.

The control unit 2, including an arithmetic and control device, such as a CPU (central processing unit), for example, controls each unit that is a part of the mobile communication terminal device 1.

The communication circuit unit 3, having a sending unit 3a and a receiving unit 3b, sends a sending signal and receives a receiving signal to and from a mobile phone base station (for example, a base station 40 in FIG. 1) via the antenna 4 under control of the control unit 2 during a call. The communication circuit unit 3 also carries out modulation and demodulation of radio waves sent and received to and from the mobile phone base station.

The display unit 5 is a liquid crystal display (LCD) and the like. The operation unit 6 has a jog dial, a key pad, and the like. In the operation unit 6, it is possible to input operation signals, such as for input operations for phone numbers and mail texts, and setting operations for various modes.

The storage unit 7 is a non-volatile memory, such as a flash memory (semiconductor memory). In the storage unit 7, various data and computer programs, such as address books, schedules, mail messages, video images, still images, music, application software, bookmarks, and websites, are saved.

The GPS control unit 14 demodulates GPS information received via the GPS antenna 13 under control of the control unit 2 to acquire information on the current position (latitude and longitude) of the mobile communication terminal device 1.

The identification information of the mobile communication terminal device 1 is registered in the HLR 51 via the sending unit 3a, the antenna 4, the base station 40, and the mobile communication system network 50. The registration information of the QoS guaranteed area 30 is sent to the QoS control device 52 via the sending unit 3a, the antenna 4, the base station 40, and the mobile communication system network 50. Conversely, the QoS guarantee is offered from the QoS control device 52 via the mobile communication system network 50, the base station 40, the antenna 4, and the receiving unit 3b to the mobile communication terminal device 1.

[System Behavior]

Figure 3:
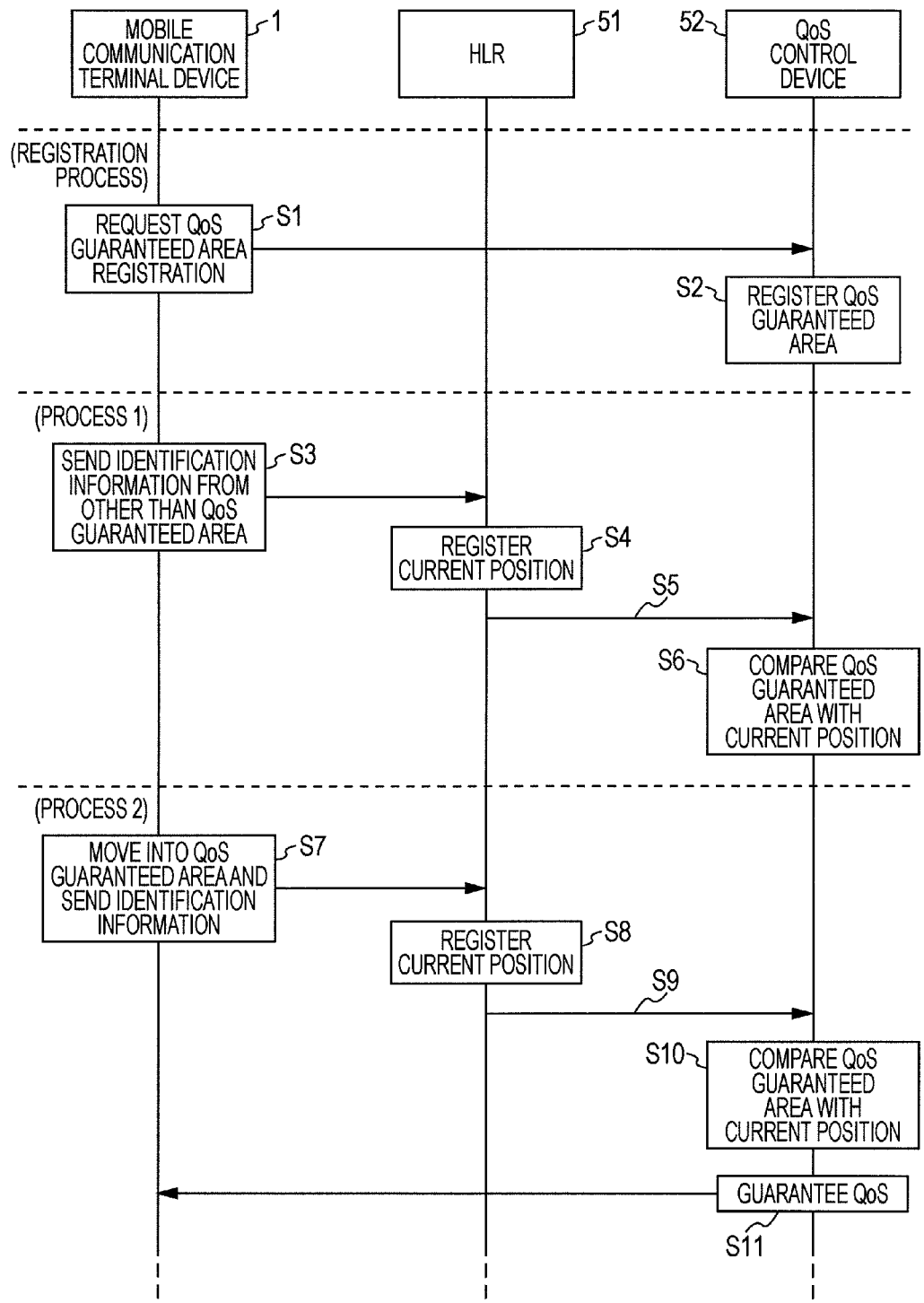
FIG. 3 is a chart illustrating a sequence of behaviors of the QoS guaranteed mobile communication system in the embodiment.
Figure 4:
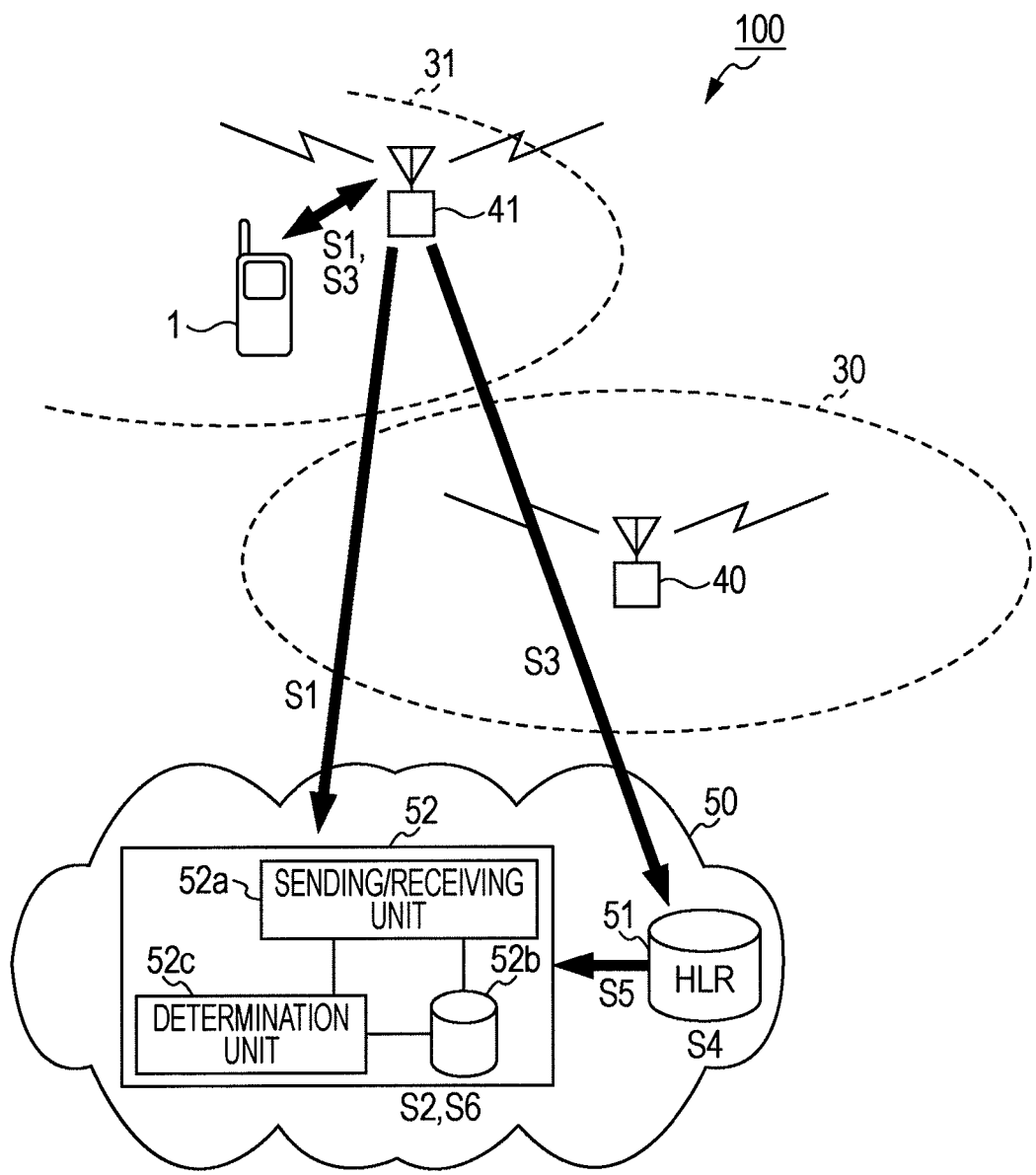
FIG. 4 is a chart illustrating a condition of behaviors of the QoS guaranteed mobile communication system in the embodiment.
Figure 5:
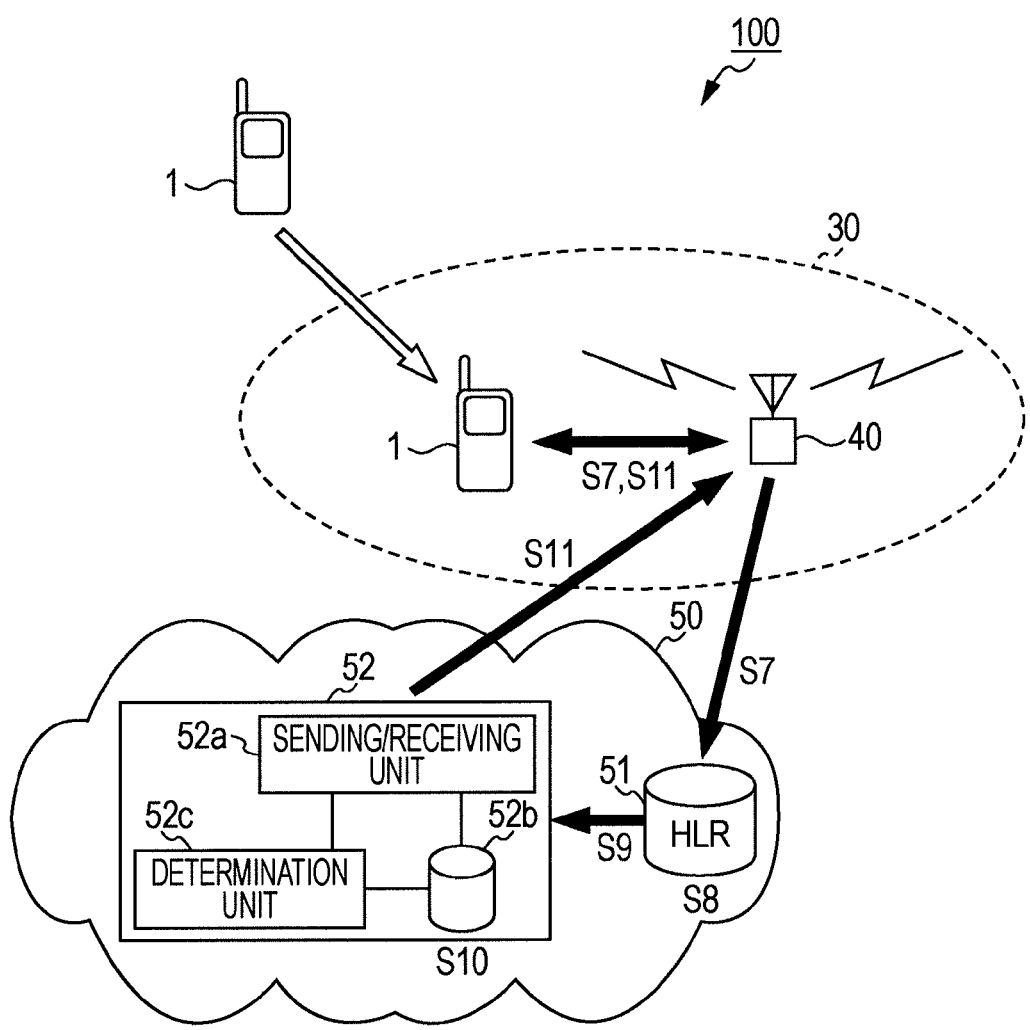
FIG. 5 is a chart illustrating another condition of behaviors of the QoS guaranteed mobile communication system in the embodiment.

Next, a description is given to behaviors of the QoS guaranteed mobile communication system 100 of the present embodiment with reference to FIGS. 3 through 5. FIG. 3 is a chart illustrating a sequence of behaviors of the QoS guaranteed mobile communication system 100 of the present embodiment, and illustrates individual behaviors of the mobile communication terminal device 1, the HLR 51, and the QoS control device 52 and conditions of sending and receiving data therebetween. FIG. 3 also illustrates sequences of a process of registration of the QoS guaranteed area 30, a process while the mobile communication terminal device 1 does not exist in the QoS guaranteed area 30 (process 1), and a process when the mobile communication terminal device 1 moves into the QoS guaranteed area 30 (process 2).

FIG. 4 is a chart illustrating conditions of the process of registration of the QoS guaranteed area 30 and the process while the mobile communication terminal device 1 does not exist in the QoS guaranteed area 30 (process 1). FIG. 5 is a chart illustrating a condition of the process when the mobile communication terminal device 1 exists in the QoS guaranteed area 30 (process 2). In the examples of FIGS. 3 through 5, a case is considered that a cell of the base station 40 (or positional information of the base station 40) in FIG. 4 is registered in the QoS control device 52 as the QoS guaranteed area 30.

First, a description is given to the sequence of the process of registration of the QoS guaranteed area 30 in the present embodiment with reference to FIGS. 3 and 4. This is preprocessing for the user to be QoS guaranteed. The mobile communication terminal device 1 (user) sends registration request information of the QoS guaranteed area 30 (cell) to the QoS control device 52 via a base station (a base station 41 in the example of FIG. 4) within the cell where currently positioned (step S1). In step S1, for example, the user displays a page for QoS registration on a display screen of the display unit 5 and selects a menu for registration of the QoS guaranteed area 30 or the like to register the QoS guaranteed area 30.

Subsequently, the QoS control device 52 receives the information on the QoS guaranteed area 30 sent from the mobile communication terminal device 1 in the sending/receiving unit 52a to register (store) the information on the QoS guaranteed area 30 in the database 52b (step S2). In the present embodiment, the QoS guaranteed area 30 is registered in such a manner.

Next, a description is given to the sequence of the process while the mobile communication terminal device 1 does not exist in the QoS guaranteed area 30 (process 1) with reference to FIGS. 3 and 4. Here, a case is considered that the mobile communication terminal device 1 (user) moves into a position other than the QoS guaranteed area 30 (cell of the base station 40), specifically a cell 31 of the base station 41 in FIG. 4.

In a case that the mobile communication terminal device 1 moves into the cell 31 of the base station 41 in FIG. 4, identification information of the mobile communication terminal device 1 is automatically sent to the HLR 51 via the base station 41 and the mobile communication system network 50 (step S3). At this point, information related to the base station 41 is also sent to the HLR 51. Subsequently, the HLR 51 receives the identification information of the mobile communication terminal device 1 and the information related to the base station 41 and registers (updates) information on the current position of the mobile communication terminal device 1 according to the information for management (step S4).

Subsequently, the QoS control device 52 acquires the information on the current position of the mobile communication terminal device 1 registered in the HLR 51 from the HLR 51 (step S5). In step S5, for example, every time the information on the current position of the mobile communication terminal device 1 is updated, the information is automatically sent from the HLR 51 to the QoS control device 52.

Subsequently, the QoS control device 52 compares the information on the QoS guaranteed area 30 registered in the database 52b with the information on the current position of the mobile communication terminal device 1 acquired from the HLR 51 in the determination unit 52c to determine whether or not to offer a QoS to the mobile communication terminal device 1 (step S6). Since the mobile communication terminal device 1 does not exist in the QoS guaranteed area 30 in the example of FIG. 4, the QoS control device 52 does not carry out a QoS guarantee to the mobile communication terminal device 1. In the present embodiment, in a case that the mobile communication terminal device 1 does not exist in the QoS guaranteed area 30, the process is carried out in such a manner.

Next, a description is given to the sequence of the process when the mobile communication terminal device 1 exists in the QoS guaranteed area 30 (process 2) with reference to FIGS. 3 and 5. Here, as illustrated in FIG. 5, a case is considered that the mobile communication terminal device 1 (user) moves from the cell 31 of the base station 41 into the cell of the base station 40, that is to say, into the QoS guaranteed area 30 (the white arrow in FIG. 5).

When the mobile communication terminal device 1 moves into the QoS guaranteed area 30 of the base station 40, the identification information of the mobile communication terminal device 1 is automatically sent to the HLR 51 via the base station 40 and the mobile communication system network 50 (step S7). At this point, information related to the base station 40 is also sent to the HLR 51. Subsequently, the HLR 51 receives the identification information of the mobile communication terminal device 1 and the information related to the base station 40 and registers (updates) information on the current position of the mobile communication terminal device 1 according to the information for management (step S8).

Subsequently, the QoS control device 52 acquires the information on the current position of the mobile communication terminal device 1 registered in the HLR 51 from the HLR 51 (step S9). Then, similarly to step S6 in the process 1 described above, the QoS control device 52 determines whether or not to carry out a QoS guarantee to the mobile communication terminal device 1 (step S10).

Then, since the mobile communication terminal device 1 exists in the QoS guaranteed area 30 in the example of FIG. 5, the QoS control device 52 guarantees QoS to the mobile communication terminal device 1 via the mobile communication system network 50 and the base station 40 (step S11). In the present embodiment, in a case that the mobile communication terminal device 1 exists in the QoS guaranteed area 30, the process is carried out in such a manner. The processes 1 and 2 described above are carried out every time the mobile communication terminal device 1 moves, that is, every time the information on the current position registered in the HLR 51 is updated.

As described above, in the QoS guaranteed mobile communication system 100 of the present embodiment, it is possible for a QoS user to set the area to be QoS guaranteed and to receive QoS guarantee automatically and preferentially only within the area. Therefore, in the present embodiment, an intention of a user can be reflected at the time of a QoS guarantee.

When applying a QoS guarantee technique to all users and all regions for a QoS guarantee, the load of the mobile communication system network increases. However, in the present embodiment, it is possible for the QoS user to set an area to be QoS guaranteed and to receive QoS guarantee only in the area, so that the load of the mobile communication system network can be reduced. Further in the present embodiment, since a QoS user can receive QoS guarantee only in the preferred area, QoS can be offered at a lower price.

Another Embodiment

In another embodiment, a description is given to an exemplary configuration of a QoS guaranteed mobile communication system that carries out QoS guarantee according to information on the current position of a mobile communication terminal device obtained from the GPS.

[Configuration of QoS Guaranteed Mobile Communication System]

Figure 6:
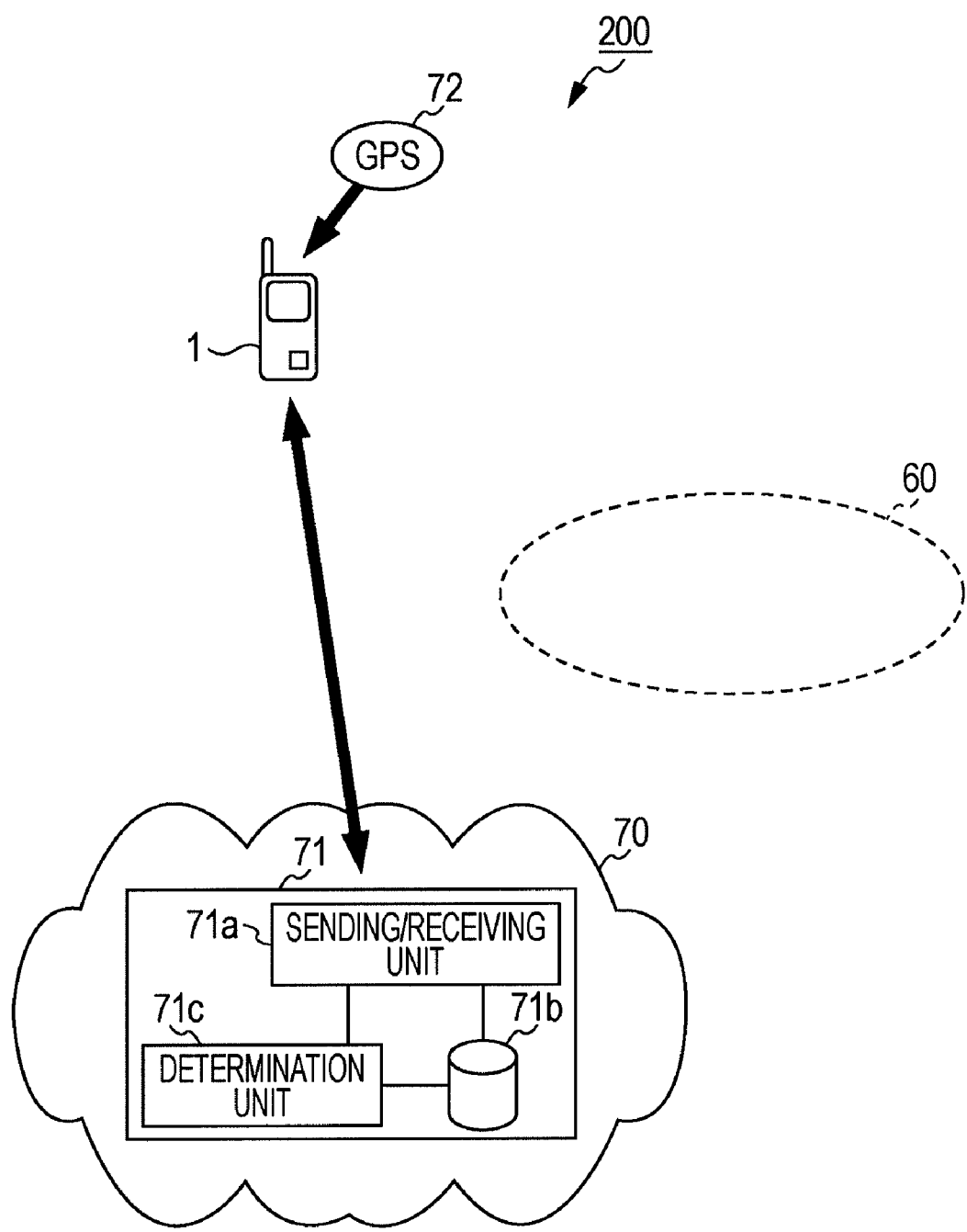
FIG. 6 illustrates the configuration of a QoS guaranteed mobile communication system according to another embodiment of the present invention.

FIG. 6 illustrates the configuration of a QoS guaranteed mobile communication system working in conjunction with the GPS of the present embodiment. A QoS guaranteed mobile communication system 200 is mainly configured with a mobile communication terminal device 1 and a QoS control device 71 provided within a predetermined mobile communication system network 70. In the present embodiment, similarly to the embodiment described earlier, sending and receiving data between the mobile communication terminal device 1 and the QoS control device 71 (the mobile communication system network 70) is also carried out via a base station although it is omitted in FIG. 6 to simplify the description.

The QoS control device 71 has a configuration similar to that of the QoS control device 52 (FIG. 1) described in the embodiment described earlier, and is provided with a sending/receiving unit 71a (including a QoS receiving unit), a database 71b (storage unit), and a determination unit 71c. Since the functions of each unit are also similar to those in the embodiment described earlier, descriptions for the functions of each unit are omitted here.

The mobile communication terminal device 1 has a configuration similar to that of the mobile communication terminal device (FIG. 2) described in the embodiment described earlier. Therefore, descriptions for the configuration and the functions of each unit in the mobile communication terminal device 1 are omitted. In the present embodiment, the information on the current position of the mobile communication terminal device 1 is acquired in the GPS control unit 14 via the GPS antenna 13 from a GPS 72 to send the information to the QoS control device 71.

[System Behavior]

Figure 7:
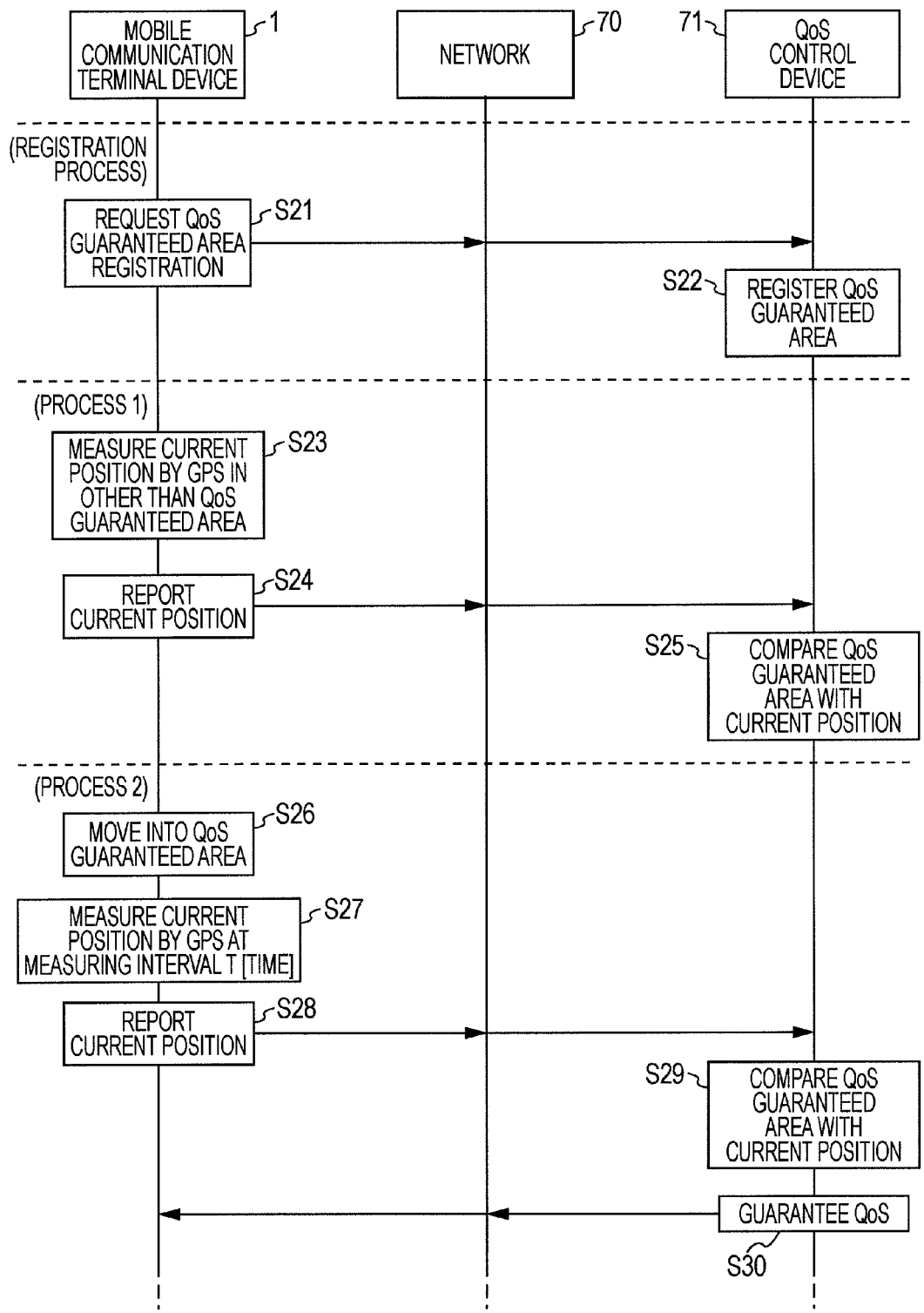
FIG. 7 is a chart illustrating a sequence of behaviors of the QoS guaranteed mobile communication system in the other embodiment.
Figure 8:
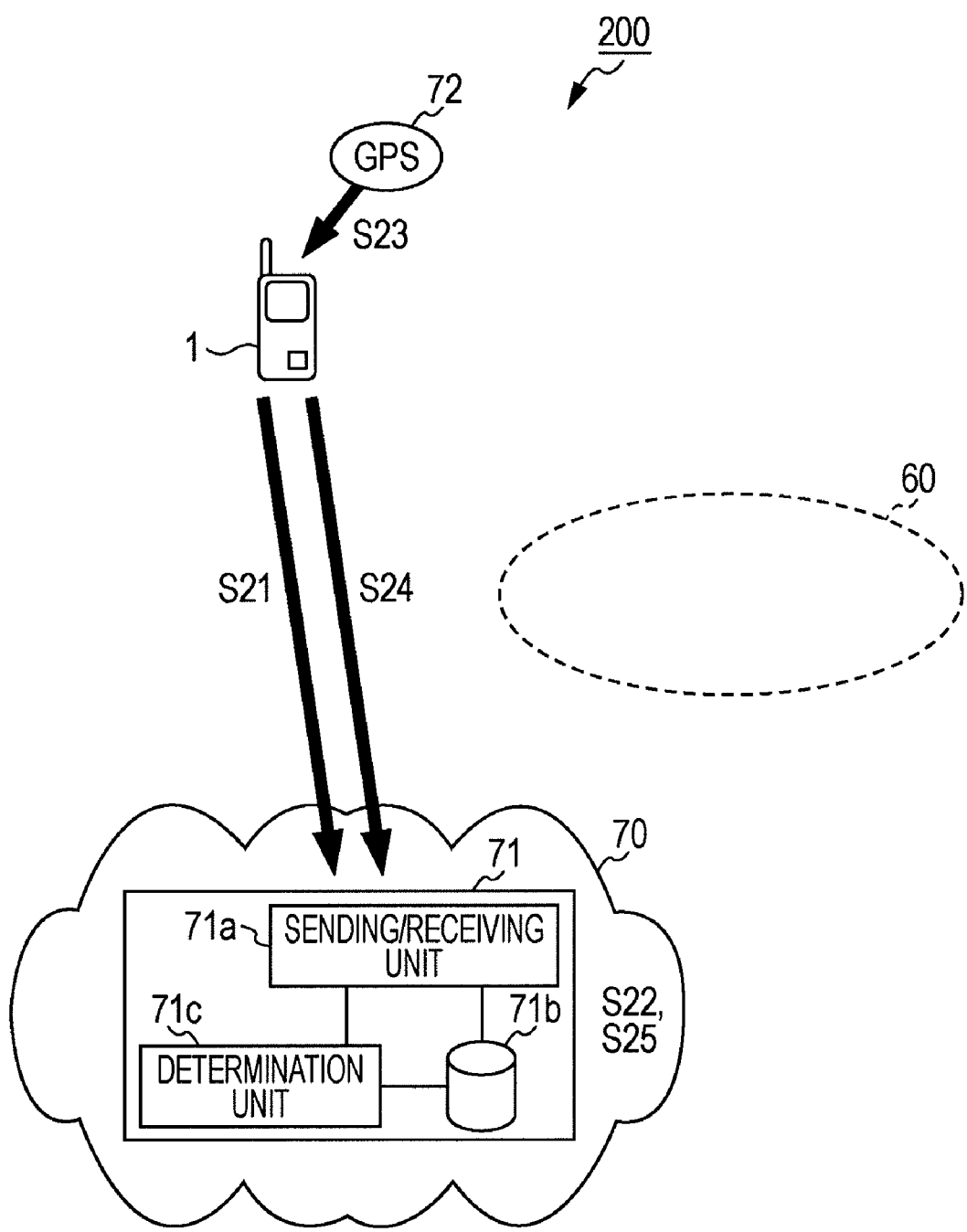
FIG. 8 is a chart illustrating a condition of behaviors of the QoS guaranteed mobile communication system in the other embodiment.
Figure 9:
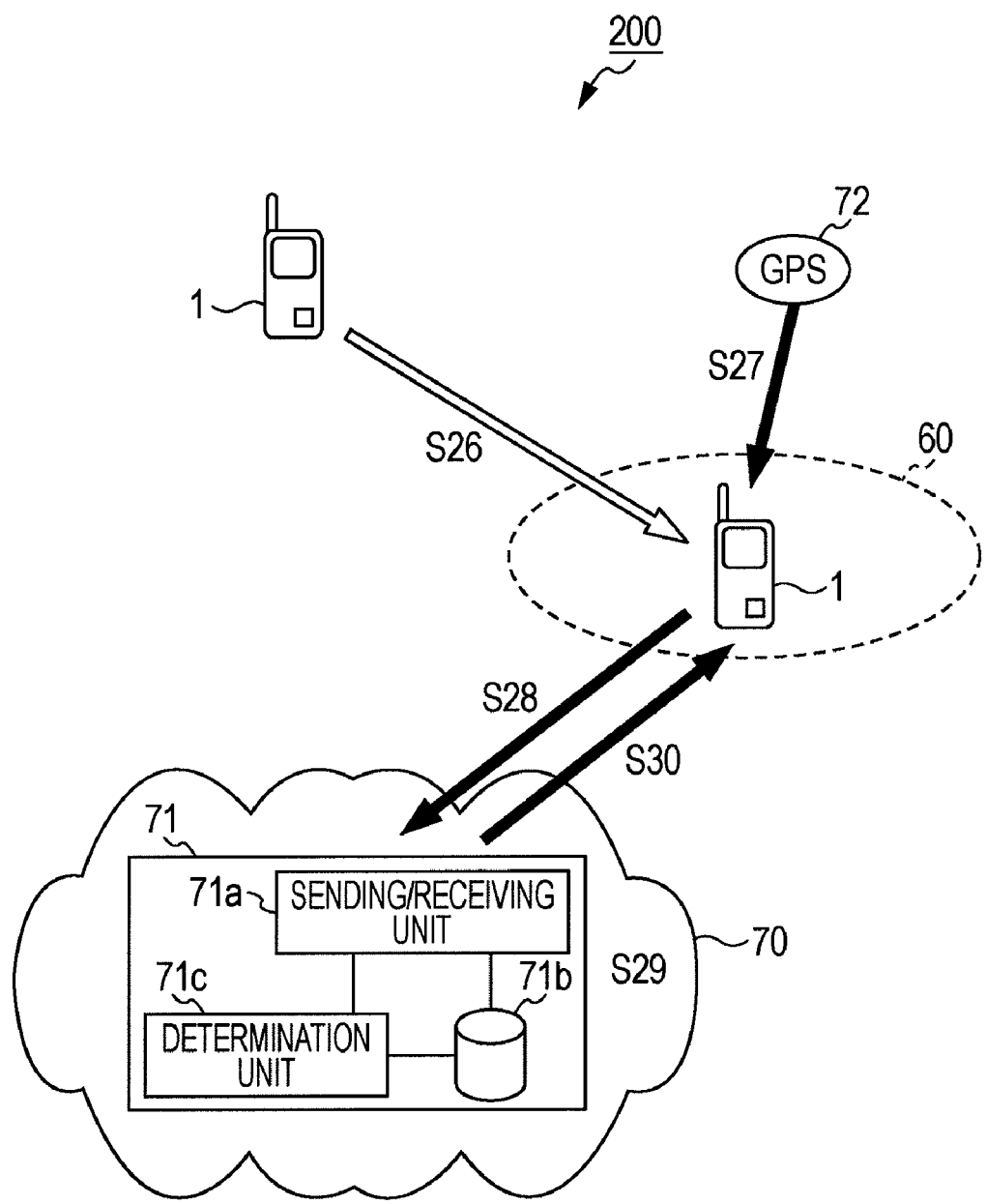
FIG. 9 is a chart illustrating another condition of behaviors of the QoS guaranteed mobile communication system in the other embodiment.

Next, a description is given to behaviors of the QoS guaranteed mobile communication system 200 of the present embodiment with reference to FIGS. 7 through 9. FIG. 7 is a chart illustrating a sequence of behaviors of the QoS guaranteed mobile communication system 200 in the present embodiment, and illustrates conditions of sending and receiving of data carried out by the mobile communication terminal device 1 and the QoS control device 71 via the mobile communication system network 70. FIG. 7 also illustrates the sequences of the process of registration of a QoS guaranteed area 60, a process when the mobile communication terminal device 1 does not exist in the QoS guaranteed area 60 (registered area) (process 1), and a process when the mobile communication terminal device 1 exists in the QoS guaranteed area 60 (process 2).

FIG. 8 is a chart illustrating conditions of the process of registration of the QoS guaranteed area 60 and the process when the mobile communication terminal device 1 does not exist in the QoS guaranteed area 60 (process 1). FIG. 9 is a chart illustrating a condition of the process when the mobile communication terminal device 1 exists in the QoS guaranteed area 60 (process 2).

First, a description is given to the sequence of the registration process in the QoS guaranteed mobile communication system 200 of the present embodiment with reference to FIGS. 7 and 8. The mobile communication terminal device 1 (user) sends registration request information of the QoS guaranteed area 60 via the mobile communication system network 70 to the QoS control device 71 (step S21). In step S21, for example, the user displays a page for QoS registration on a display screen of the display unit 5 and selects a menu for registration of the QoS guaranteed area 60 and the like to register the QoS guaranteed area 60.

Subsequently, the QoS control device 71 receives information on the QoS guaranteed area 60 that is sent from the mobile communication terminal device 1 in the sending/receiving unit 71a to register (store) the information on the QoS guaranteed area 60 in the database 71b (step S22). In the present embodiment, GPS information (latitude and longitude) is used as the information on the current position of the mobile communication terminal device 1, so that information on the QoS guaranteed area 60 defined by the latitude and the longitude is registered in the database 71*b* of the QoS control device 71. In the present embodiment, the QoS guaranteed area 60 is registered in such a manner.

Next, a description is given to the sequence of the process when the mobile communication terminal device 1 does not exist in the QoS guaranteed area 60 (process 1) in the present embodiment with reference to FIGS. 7 and 8.

First, the mobile communication terminal device 1 (user) acquires (measures) information on the current position from the GPS 72 (step S23). Subsequently, the mobile communication terminal device 1 sends the acquired information on the current position to the QoS control device 71 via the mobile communication system network 70 (step S24).

Subsequently, the QoS control device 71 compares the acquired information on the current position of the mobile communication terminal device 1 with the information on the QoS guaranteed area 60 registered in the database 71*b* in the determination unit 71*c* to determine whether or not to offer a QoS service to the mobile communication terminal device 1 (step S25). Then, since the mobile communication terminal device 1 does not exist in the QoS guaranteed area 60 in the example of FIG. 8, the QoS control device 71 does not offer QoS to the mobile communication terminal device 1. In the present embodiment, when the mobile communication terminal device 1 does not exist in the QoS guaranteed area 60, the process is carried out in such a manner.

Next, a description is given to the sequence of the process when the mobile communication terminal device 1 exists in the QoS guaranteed area 60 (process 2) with reference to FIGS. 7 and 9.

First, the mobile communication terminal device 1 (user) moves into the QoS guaranteed area 60 (step S26, as indicated by the white arrow in FIG. 9). Subsequently, the mobile communication terminal device 1 acquires (measures) information on the current position from the GPS 72 (step S27). Subsequently, the mobile communication terminal device 1 sends the acquired information on the current position to the QoS control device 71 via the mobile communication system network 70 (step S28).

Subsequently, the QoS control device 71 compares the acquired information on the current position of the mobile communication terminal device 1 with the information on the QoS guaranteed area 60 registered in the database 71*b* in the determination unit 71*c* to determine whether or not to offer a QoS service to the mobile communication terminal device 1 (step S29).

Since the mobile communication terminal device 1 exists in the QoS guaranteed area 60 in the example of FIG. 9, the QoS control device 71 guarantees QoS to the mobile communication terminal device 1 via the mobile communication system network 70 (step S30). In the present embodiment, when the mobile communication terminal device 1 exists in the QoS guaranteed area 60, the process is carried out in such a manner.

In the processes 1 and 2 described above, the procedure that the mobile communication terminal device 1 acquires the information on the current position from the GPS 72 (steps S23 and S27) is carried out at a predetermined time interval T, and carries out comparison with the QoS guaranteed area 60 (steps S25 and S29) every time of the acquisition. That is, the processes 1 and 2 described above are repeatedly carried out at the predetermined time interval T. Such a time interval T can be set by the user appropriately. The processes 1 and 2 described above may also be carried out by the user appropriately as desired.

As described above, in the QoS guaranteed mobile communication system 200 of the present embodiment, it is possible for the QoS user to set an area to be QoS guaranteed and to receive QoS guarantee only within the area automatically and preferentially. Therefore, in the present embodiment, similarly to the embodiment described earlier, an intention of the user can be reflected at the time of QoS guarantee.

In the present embodiment, the QoS user can also receive QoS guarantee only in a desired area, so that the load of the mobile communication system network can be reduced and also QoS can be offered at a lower price.

Although descriptions have been given to the examples of using the positional information managed in the HLR and the positional information from the GPS as the information on the current positions of the mobile communication terminal device 1 in the embodiments described above, this is not a limitation. It is possible to use any information as long as the information can identify the position of the mobile communication terminal device 1. For example, at the time of passing an input/output control gate (flapper gate) of a predetermined facility (such as a movie theater), the information of passing there may also be used as the positional information. In this case, information related to the facility to be used is preregistered in the QoS control device, and at the time that the mobile communication terminal device 1 passes an input/output control gate of the predetermined facility (such as a movie theater), the information is sent to the QoS control device to be compared with preregistered information on the QoS guaranteed area.

Although descriptions have been given to the examples of limiting only the area to offer QoS in the embodiments described above, this is not a limitation. For example, in addition to the QoS guaranteed area, the time range to utilize QoS may also be limited.

The present application contains subject matter related to that disclosed in Japanese Priority Patent Application JP 2009-005936 filed in the Japan Patent Office on Jan. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile communication terminal device, comprising:
   an operation unit registering information related to a predetermined region in which a user desires QoS (Quality of Service) guarantee;
   a sending unit sending the information related to the predetermined region registered in the operation unit and information that identifies a current position of the mobile communication terminal device;
   a receiving unit receiving QoS guaranteed data when the current position is in the predetermined region; and
   a control unit controlling a behavior of sending the information in the sending unit and a behavior of receiving the QoS guaranteed data in the receiving unit.

2. The mobile communication terminal device according to claim 1, wherein the sending unit sends information that identifies the current position is positional information that is registered in a home location register.

3. The mobile communication terminal device according to claim 1, further comprising a positional information acquisition unit acquiring information on the current position from a global positioning system:
   wherein the information which identifies the current position is the information acquired in the positional information acquisition unit.

4. A QoS (Quality of Service) control device, comprising:
   a receiving unit receiving information related to a predetermined region in which a user desires QoS guarantee and information that identifies a current position of a mobile communication terminal device, which are sent from a mobile communication terminal device;
   a storage unit storing the information related to the predetermined region received at the receiving unit;
   a determination unit comparing the information which identifies the current position of the mobile communication terminal device with the information related to the predetermined region stored in the storage unit; and
   a sending unit sending QoS guaranteed data to the mobile communication terminal device when the current position of the mobile communication terminal device is in the predetermined region according to a result of the comparison in the determination unit.

5. A mobile communication system, comprising:
   a mobile communication terminal device having an operation unit registering information related to a predetermined region in which a user desires QoS (Quality of Service) guarantee, a positional information sending unit sending the information related to the predetermined region registered in the operation unit and information that identifies a current position of the mobile communication terminal device, a receiving unit receiving QoS guaranteed data when the current position is in the predetermined region, and a control unit controlling a behavior of sending the information in the sending unit and a behavior of guaranteeing the QoS in the receiving unit; and
   a QoS control device having a storage unit storing the information on the predetermined region in which the user desires the QoS guarantee, which is sent from the positional information sending unit of the mobile communication terminal device, a determination unit comparing the information which identifies the current position of the mobile communication terminal device, which is sent from the positional information sending unit, with the information related to the predetermined region stored in the storage unit, and a QoS sending unit sending the QoS guaranteed data to the mobile communication terminal device when the current position of the mobile communication terminal device is in the predetermined region according to the result of the comparison in the determination unit.

6. A method of guaranteeing QoS (Quality of Service), comprising the steps of:
   sending information related to a predetermined region in which a user desires QoS guarantee from a mobile communication terminal device to a QoS control device;
   sending information that identifies a current position of the mobile communication terminal device directly or indirectly from the mobile communication terminal device to the QoS control device;
   comparing the acquired information which identifies the current position of the mobile communication terminal device with the information related to the predetermined region in the QoS control device; and
   sending QoS guaranteed data to the mobile communication terminal device when the current position of the mobile communication terminal device is in the predetermined region as the result of the comparison.

\* \* \* \* \*